United States Patent Office 2,774,633
Patented Dec. 18, 1956

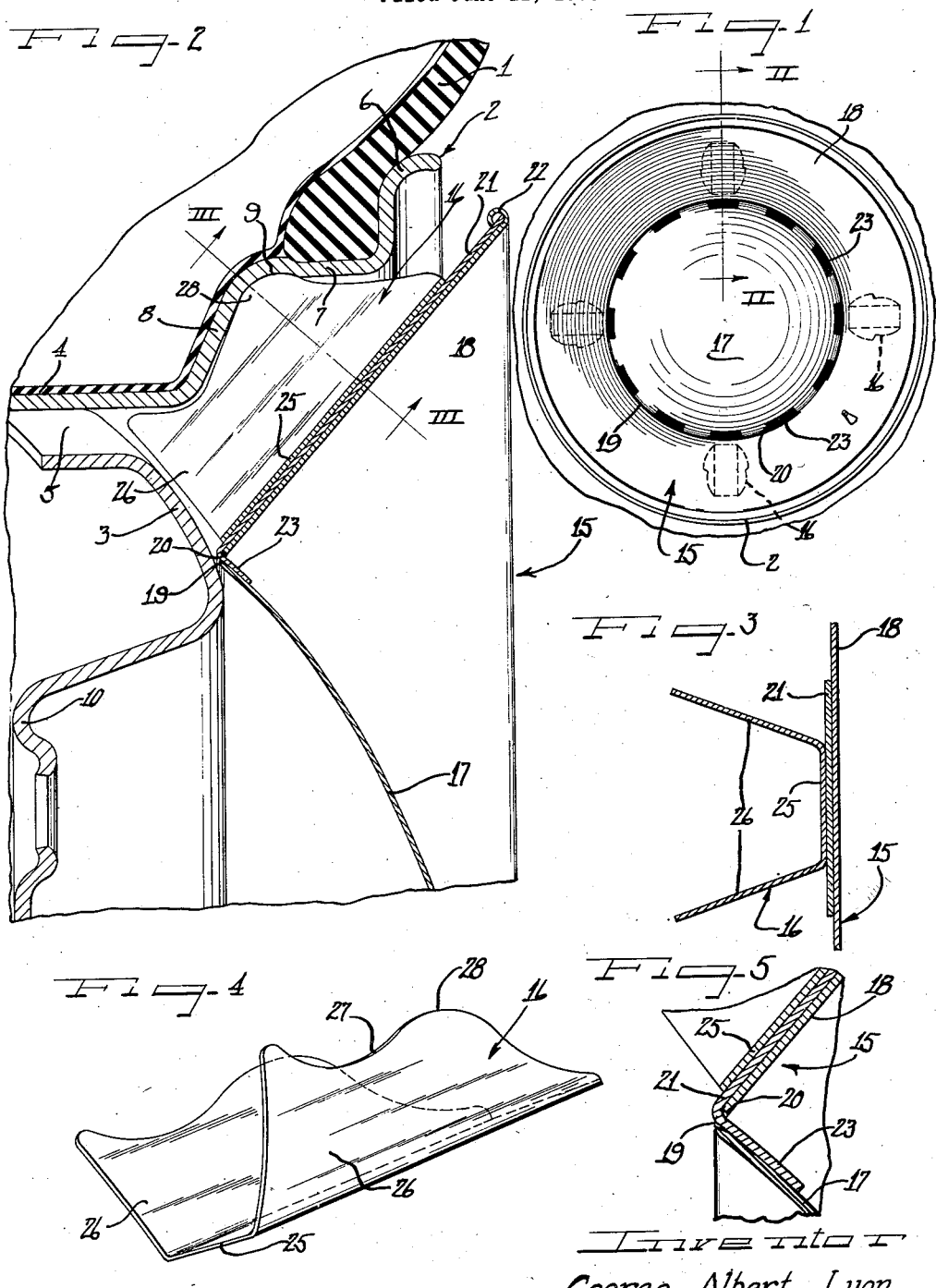

2,774,633

WHEEL COVER

George Albert Lyon, Detroit, Mich.

Application June 11, 1953, Serial No. 360,863

4 Claims. (Cl. 301—37)

This invention relates to ornamental wheel covers and more particularly to a multi-part cover wherein the interlock between the parts is also employed for purposes of ornamentation.

An object of this invention is to provide a multi-part automobile wheel cover wherein the interlocking means employed for holding the parts together is projected over the outer side of the cover for purposes of ornamentation.

Another object of this invention is to provide a cover on its rearside with a part carrying cover retaining means and which is interlocked with the cover in such a manner that the interlocking means is visible from the exterior of the cover in the form of ornamentation.

A further object of the invention is to provide an improved interlocking and ornamental structure for the cover of my co-pending application, Serial No. 269,396.

In accordance with the general features of this invention, there is provided in a cover structure for a wheel a cover comprising divergent circular portions having at their junction spaced apertures, a circular part on the rearside of the cover having spaced tabs projecting through the apertures and overlying the opposite and outer side of the cover to interlock the part to the cover and forming an interrupted annular ornamentation on the outer side of the cover.

Another feature of the invention relates to using the rear circular part of the cover that provides the exterior ornamentation also as a carrier or support for the wheel engaging cover retaining fingers.

Other objects and features of this invention will more fully appear from the following detail description taken in connection with the accompanying drawings which illustrate a single embodiment thereof and in which.

Figure 1 is a fragmentary outer side view of a wheel assembly having a cover embodying the features of this invention;

Figure 2 is an enlarged fragmentary cross-sectional view taken on substantially the line II—II of Figure 1 looking in the direction indicated by the arrows;

Figure 3 is a detail sectional view taken on the line III—III of Figure 2 looking upwardly and showing the cross-sectional contour of one of the cover retaining spring clips;

Figure 4 is a perspective view of one of the cover retaining spring clips; and

Figure 5 is an enlarged fragmentary cross-sectional view corresponding to a part of Figure 2 but showing an an enlarged scale how the ornamental tabs are interlocked with the cover.

As shown on the drawings:

The reference character 1 designates generally a conventional pneumatic automobile tire and tube assembly which is carried in the standard manner upon a conventional multi-flanged drop center type of tire rim 2.

This tire rim is, in turn, supported upon a metallic stamped body 3 secured at spaced intervals to the base flange 4 of the rim 2 leaving the usual air circulating spaced wheel openings 5. In other words, the openings 5 alternate with the points of securement of the rim 2 to the wheel body 3 as is well known in the art.

It should also be noted that the conventional rim 2 has a terminal flange 6, an axial flange 7, and an inclined radial flange 8 leading into the base flange 4. At the junction of the flanges 7 and 8 there is provided an annular depression or groove 9 for assisting in the retention of the tire bead on the rim in a manner also well known. I propose to utilize this groove in the retention of my wheel cover on the wheel, which wheel may be detachably secured by its central bolt-on flange 10 to a part of the axle of the wheel as is also well known.

Cooperating with this conventional tire and wheel assembly is a sheet metal wheel cover designated generally by the reference character 15 and which embraces the features of this invention, and which has secured to it wheel engaging cover retaining spring clips 16. The cover includes divergent circular portions 17 and 18, the innermost of which 17 is formed in a crown or dome shape and the outermost of which 18 is in the form of a substantially flat annular ring extending radially and axially outwardly from the wheel body part 3.

These two divergent portions 17 and 18 have a turned junction 19 which, when the cover is on the wheel, is in close proximity to the body part 3. In accordance with the features of this invention, I provide this junction 19 with an annular series of spaced openings 20 for use in the interlocking of a rear cover part 21 to the divergent portion 18.

The rear cover part 21 is in the form of an annulus and has its outer peripheral edge secured to the cover portion 18 by a turned outer edge 22.

This cover part 17 is disposed on the rearside of the cover in contiguous relation with the rear surface of outer divergent cover portion 18. The inner edge of cover part 21 has projecting from it a plurality of spaced tabs 23 which are aligned with the apertures or slots 20 and are turned outwardly therethrough to the outer side of the cover.

At the outer side of the cover the spaced tabs closely overlie the divergent or crown portion 17 and serve to provide an annular ornamentation at the junction of the divergent portions 17 and 18. If so desired, these spaced ornamental interlocking tabs 23 may be colored to give the highly pleasing ornamental appearance shown in Figure 1. Thus, by these tabs, I am not only enabled to interlock and firmly secure the rear cover part 21 to the divergent cover portions 17 and 18 comprising the main body of the cover but, in addition, I am enabled to employ these tabs as an ornamental structure for the cover.

The purpose of the annular rear plate 21 is to carry the cover retaining means or spring clips 16 which may be of any suitable number and are identical in construction. These clips each include a base portion 25 welded to the annular part or plate 21 and having divergent legs 26—26 each of which has a cut-out edge 27 to form a retaining rounded finger portion 28 adapted to resiliently seat in the rim groove 9. The construction of these fingers is claimed in my aforesaid co-pending application.

In the application of this cover to the wheel, it is placed over the wheel body and is then pressed axially into the wheel until the finger portions of the clips resiliently snap into retaining cooperation with the rim groove 9. When the cover is in this retained position, as shown in Figure 2, it is floatingly carried on the wheel with its outer turned edge 22 spaced from the rim 2 and with its junction 19 in close proximity to the wheel body 3. The clips serve to guide the cover into the wheel as well as to center the cover on the wheel as it is wedged into resilient retaining cooperation with the tire rim.

The cover of this invention is easily removed from the wheel by applying a pry-off force under the turned edge 20 and forceably ejecting the cover from its resilient snap-on engagement with the tire rim.

I claim as my invention:

1. In a cover structure for a wheel, a cover comprising divergent circular portions having at their junction spaced apertures, a circular part on the rearside of said cover having spaced tabs projecting through said apertures and overlying the opposite and outer side of said cover to interlock said part of said cover and forming an interrupted annular ornamentation on said outer side of the cover, and wheel engaging cover retaining fingers carried by and projecting rearwardly from said circular part.

2. In a wheel structure including a wheel body and a multi-flange tire rim, a cover for disposition at the outer side of the wheel comprising divergent circular portions one of which is arranged to generally overlie the wheel body and the other of which is arranged to overlie the tire rim, a circular part on the rear side of the rim overlying portion of the cover having spaced tabs at the radially inner margin thereof, said divergent cover portions having at their junction spaced apertures and said tabs projecting through said apertures and overlying the outer side of the cover to interlock said part to the cover, said tabs forming an interrupted annular ornamentation on said outer side of the cover, and wheel engaging cover-retaining fingers carried by and projecting from said circular part for cover-retaining engagement with a flange of the tire rim.

3. In a wheel structure including a wheel body and a multi-flange tire rim, a cover for disposition at the outer side of the wheel including divergent circular portions one of which is arranged to generally overlie the wheel body and the other of which is arranged to overlie the tire rim, a circular cover part generally complementary to said other cover portion and lying against the back thereof to provide a multi-layer reinforced structure, the opposite margins of said circular cover part being interlocked with the cover, and cover retaining means, connected to and disposed behind the cover for maintaining the cover in assembly with the wheel.

4. In a wheel structure including a wheel body and a multi-flange tire rim, a cover for disposition at the outer side of the wheel comprising divergent circular portions one of which is arranged to generally overlie the wheel body and the other of which is arranged to overlie the tire rim, a circular part on the rear side of the rim overlying portion of the cover having spaced tabs at the radially inner margin thereof, said divergent cover portions having at their junction spaced apertures and said tabs projecting through said apertures and overlying the outer side of the cover to interlock said part to the cover, said tabs forming an interrupted annular ornamentation on said outer side of the cover, and cover retaining means connected to and disposed behind the cover for maintaining the cover in assembly on the wheel.

References Cited in the file of this patent

UNITED STATES PATENTS

| | | |
|---|---|---|
| 1,754,431 | Kraeft | Apr. 15, 1930 |
| 2,309,519 | Lyon | Jan. 26, 1943 |